United States Patent
Miyazawa (12)

(10) Patent No.: US 6,357,874 B1
(45) Date of Patent: Mar. 19, 2002

(54) CONNECTING STRUCTURE OF ENDPIECE AND TEMPLE

(76) Inventor: Noboru Miyazawa, 22-5-1 Ochii-cho, Sabae-shi Fukui (JP), 916-1115

( * ) Notice: Subject to any disclaimer, the term of this patent is extended or adjusted under 35 U.S.C. 154(b) by 13 days.

(21) Appl. No.: 09/632,751

(22) Filed: Aug. 4, 2000

(51) Int. Cl.$^7$ .................................................. G02C 5/22
(52) U.S. Cl. ........................ 351/153; 351/140; 351/110; 16/228
(58) Field of Search ................................ 351/153, 140, 351/150, 151, 113, 111, 114, 115, 121, 110; 16/228

(56) References Cited

U.S. PATENT DOCUMENTS 5,894,336 A * 4/1999 Baldissarutti ............... 351/153

* cited by examiner

Primary Examiner—Huang Xuan Dang
(74) Attorney, Agent, or Firm—Ohlant, Greeley, Ruggiero & Perle, LLP

(57) ABSTRACT

To generate elastic force in temples and to hold a head with pressing force generated by this elastic force so as to make eyeglasses fit more comfortably.

An end of an endpiece to be mounted to a lens is bent, and an endpiece part in a polygonal shape is rotatably mounted to the end. A central portion of the endpiece is pressed against one side of the endpiece part in a normal state. An end of the temple in contact with a user's head is fixed to the endpiece part. As the temple is opened, the endpiece part rotates and the one side then turns from the state of being in contact with the central portion of the endpiece, generating working force so as to return to the initial state and then generating the elastic force in the temple thereby.

3 Claims, 6 Drawing Sheets

CONNECTING STRUCTURE OF ENDPIECE AND TEMPLE

BACKGROUND OF THE INVENTION

1. Field of the Invention

The present invention relates to a connecting structure of an endpiece and a temple and, particularly, relates to a connecting structure of an endpiece and a temple having the property of a spring without the use of a spring in particular.

2. Description of the Related Art

Generally, eyeglasses have a frame to hold the circumferential fringe of lenses and a pair of temples provided through endpieces at both right and left sides of this frame, and endpieces and temples are rotatably mounted with hinges therebetween. Temples may be folded inward with these hinges, and can contact against the back side of frames as they are folded. The outward rotary movement of temples is blocked at the state of being roughly orthogonal to a frame.

Additionally, the endpieces are bent for adjustment, in accordance with the width of a user's head, so that temples are pressed against the user's head under the condition where the temples' outward rotary movement is blocked.

Accordingly, eyeglasses are roughly adjusted by bending the endpieces, and the optimum fit is kept by a spring property of temples themselves.

Moreover, in case of currently popular two-point frames, inner sides of both lenses are connected therebetween with screws at respective ends of a bridge. Additionally, endpieces are provided at the outer sides of both lenses, and are connected to temples through hinges. Temples may be folded by closing inward. Temples are also pressed against a user's head under the condition where the temples' outward rotary movement is blocked.

Thus, such a two-point frame provides a comfortable fit with a spring property of a bridge connecting the inner sides of both lenses therebetween and with a spring property of temples.

In any case, endpieces themselves cannot directly adjust a spring property and can only adjust it roughly. Accordingly, a spring property is kept by temples themselves or the mutual working of a bridge and temples, so that there has been a problem in that fine adjustment cannot be accomplished.

SUMMARY OF THE INVENTION

It is a first object of the present invention to provide a connecting structure of an endpiece and a temple that can demonstrate a spring property and is finely adjustable so as to provide a comfortable fit.

It is a second object of the present invention to provide a connecting structure of an endpiece and a temple that can demonstrate a spring property and is finely adjustable so as to provide a comfortable fit even without a spring property of the temple itself.

It is a third object of the present invention to provide a connecting structure of an endpiece and a temple that can prevent the endpiece from being damaged so as to block the outward rotary movement of the temple even when significant force is applied to turn the temple outward.

It is a fourth object of the present invention to provide a connecting structure of an endpiece and a temple that permits the endpiece to have a hinge property so as to demonstrate a spring function in this structure.

In order to achieve the above-mentioned objects, the present invention provides a connecting structure between an endpiece, which is arranged at a respective outer side of a pair of lenses connected by a bridge, and a temple, which is mounted to this endpiece through an endpiece part. The endpiece is of a wire form, having one end being mounted to the respective lens and having another end being bent. The endpiece part has a pair of jaw portions and a connecting portion therebetween so as to connect these jaw portions. The end of the endpiece is inserted to a center hole provided at the center of the jaw portions and is rotatably supported. Moreover, a flat part is formed at the connecting portion so as to press a central portion of the endpiece against the flat part in a line contact or surface contact, and the temple is fixed to the connecting portion of the endpiece part.

Additionally, the endpiece preferably has a bent portion at the other end so as to contact against the temple, which is turned outward, thus preventing the temple from moving further. The connecting portion of the endpiece part may be in a prismatic form at least at a section where the endpiece is pressed against, and one side of this prismatic form may be the flat part mentioned above.

With the above-mentioned units, the present invention operates to restore the initial state, in other words, the state before the rotation of the endpiece part by the force generated between the endpiece part and a central portion of the endpiece in contact with the flat part of the endpiece part, when the endpiece part rotates. Therefore, fixing the temple to the endpiece part permits the temple to press against a user's head when the temple is rotated outward.

DESCRIPTION OF THE PREFERRED EMBODIMENT

Figure 1:
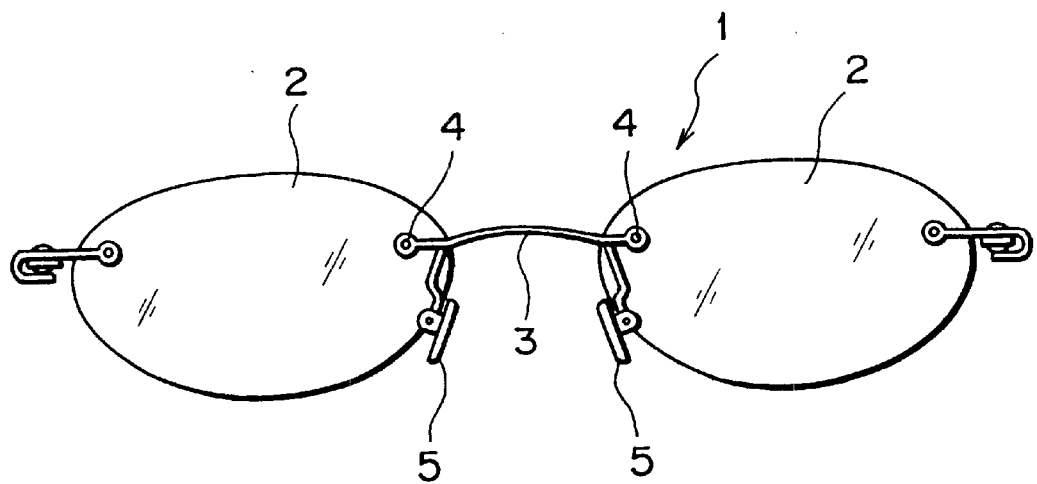
FIG. 1 is a schematic front view of eyeglasses using the connecting structure of an endpiece and a temple according to the present invention.

Embodiments will be explained by referring to the drawings.

Figure 2:
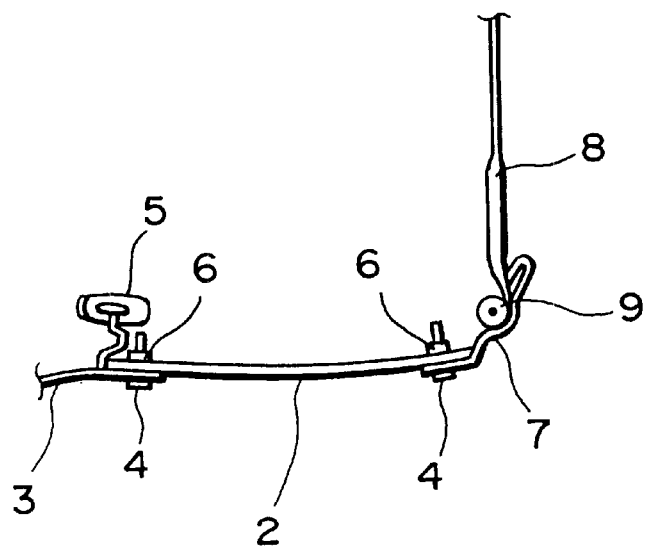
FIG. 2 is a schematic plan view showing one side of FIG. 1.
Figure 3:
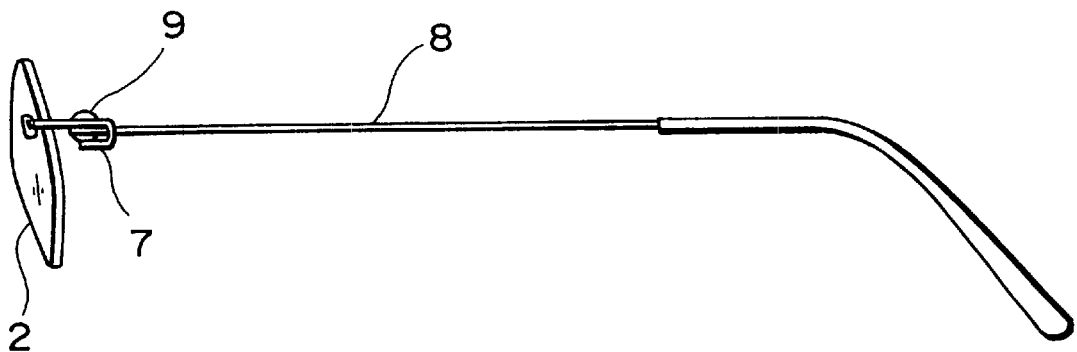
FIG. 3 is a schematic side view of FIG. 1.

FIG. 1 to FIG. 3 shows eyeglasses having the connecting structure of an endpiece and a temple of the present invention. Eyeglasses 1 have a pair of lenses 2 being fixed with screws 4 to both ends of a wire bridge 3 between the inner sides of the lenses 2. Specifically, the bridge 3 having nose pads 5 in one body is arranged in front of the lenses 2, and is also formed with each hole at both ends. The screws 4 are inserted through these holes as well as holes formed in the lenses 2, and are fixed with nuts 6 at the backside of the lenses.

Thus, both lenses 2 are connected by the wire bridge 3.

The outer sides of the lenses 2 are fixed at the back sides of the lenses 2 with nuts 6 by inserting screws 4 through holes at one end of wire endpieces 7 in a plate form and through holes formed in the lenses 2.

Figure 4:
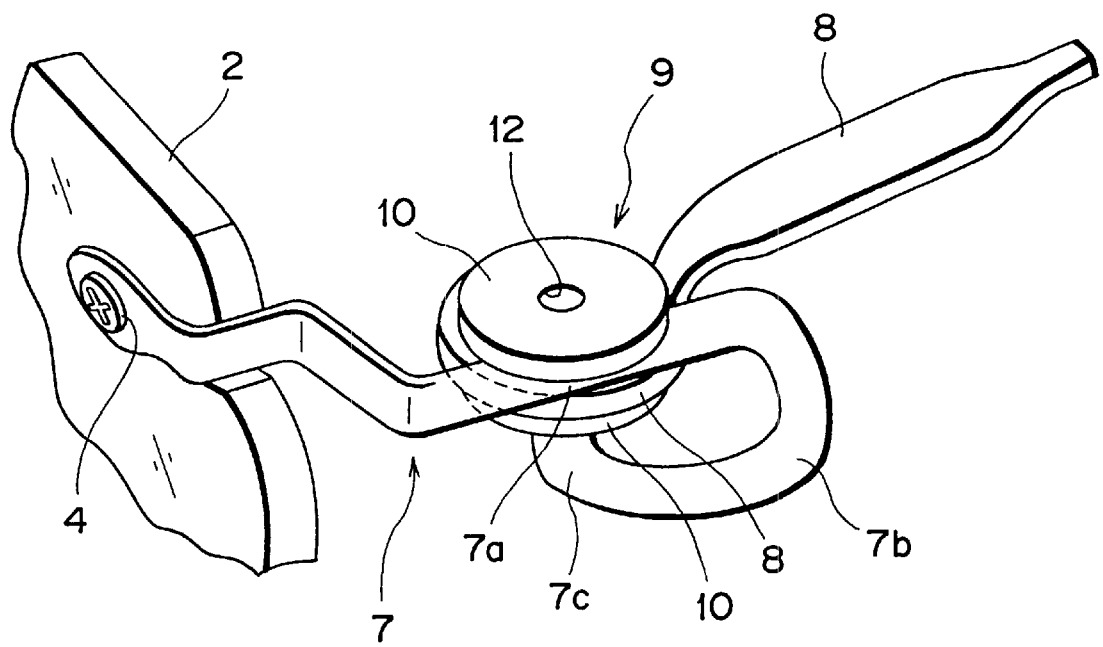
FIG. 4 is an enlarged schematic perspective view showing the connecting structure of an endpiece and a temple according to the present invention.

Moreover, the endpieces 7 and temples 8 are connected through endpiece parts 9 arranged at the endpieces 7. FIG. 4 shows the state where the endpiece 7 and the temple 8 are connected.

The endpiece 7 is in a wire form and has a hole to be fixed to the lens 2 with the screw 4 at one end. Additionally, a central portion 7a of the endpiece 7 extends backward. Bending the other end downward and then towards the lens 2 forms a bent portion 7b, and bending the end upward forms an upright portion 7c.

Figure 5:
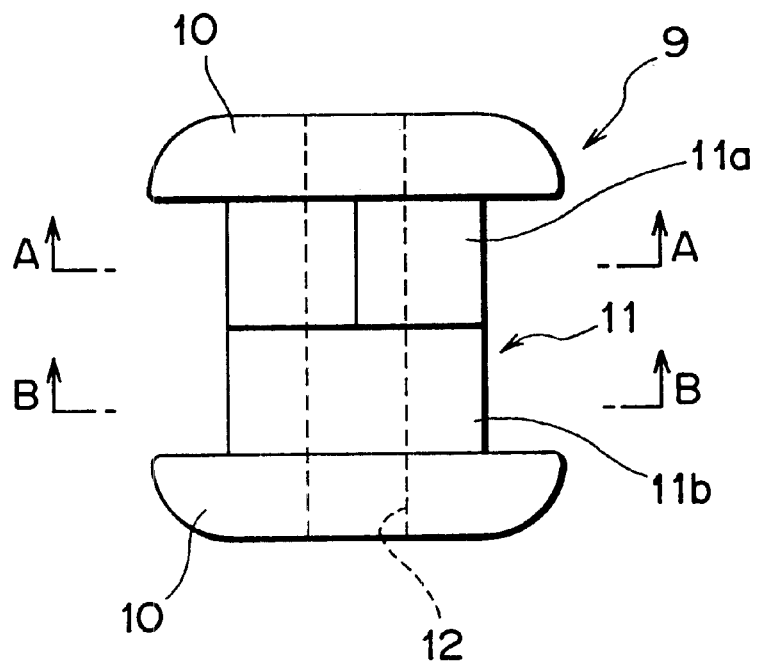
FIG. 5 is a schematic front view of an endpiece part.
Figure 6:
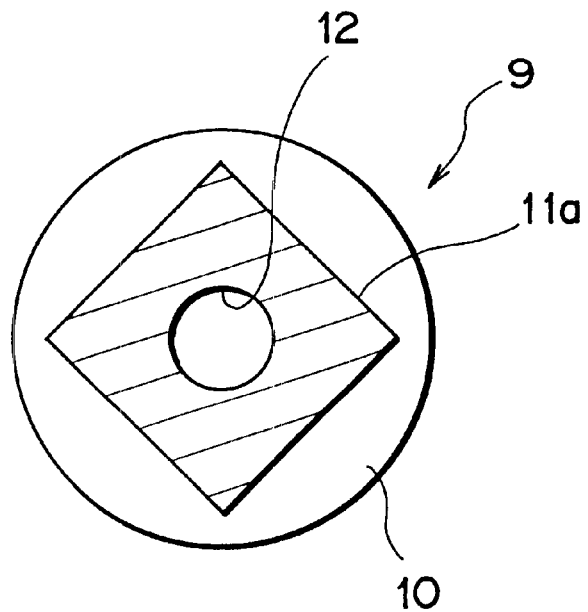
FIG. 6 is a view taken on line A—A of FIG. 5.
Figure 7:
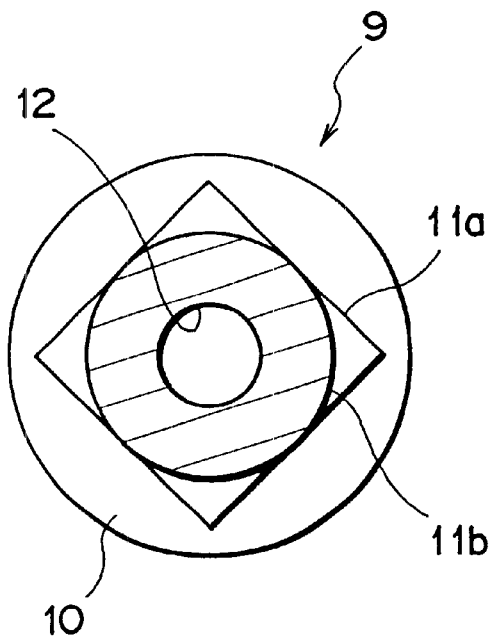
FIG. 7 is a view taken on line B—B of FIG. 5.
Figure 8:
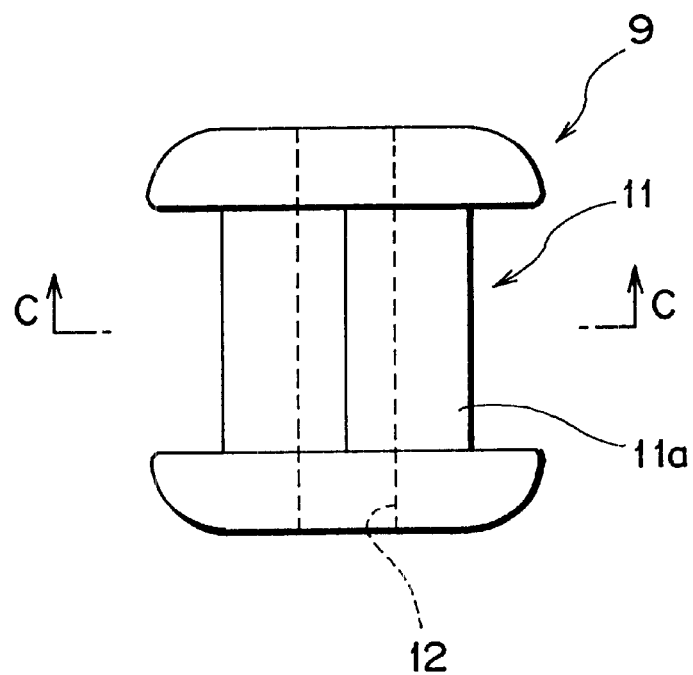
FIG. 8 is a schematic front view showing another endpiece part.
Figure 9:
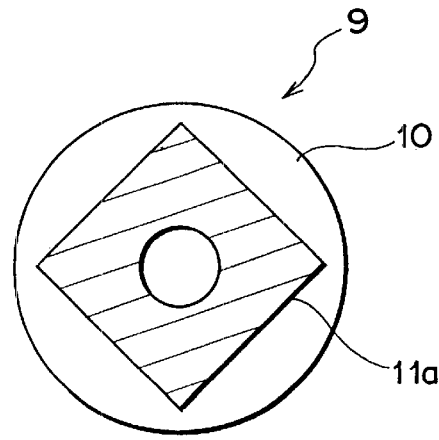
FIG. 9 is a view taken on line C—C of FIG. 8.

The endpiece part 9 connecting the endpiece 7 and the temple 8 is formed as shown in FIG. 5 to FIG. 7.

Specifically, a pair of top and bottom jaw portions 10 are connected in one body with a connecting portion 11, which is made up of a prismatic portion 11a and a cylindrical portion 11b. A center hole 12, running through the top and bottom jaw portions 10 as well as the connecting portion 11, is provided at the center of the jaw portions 10.

Additionally, the height of the prismatic portion 11a is roughly the same as the thickness of the wire endpiece 7, and the height of the cylindrical portion 11b is roughly the same as the thickness of the temple 8.

Thus, the endpiece 7 and the temple 8 may be located between both jaw portions 10 of the endpiece part 9.

Assembling the above structure will now be described.

First, there is provided the central portion 7a of the wire endpiece 7, having a hole at one end so as to be fixed to the lens 2 with the screw 4, at the prismatic portion 11a of the endpiece part 9. Therefore, the central portion 7a of the wire endpiece 7 is in a surface contact condition with one side of the prismatic portion 11a. The end of the wire endpiece 7 is bent towards the cylindrical portion 11b and below the jaw portion 10, and then caught by inserting the upright portion 7c into the central hole 12 of the endpiece part 9.

Accordingly, the endpiece part 9 is rotatably connected to the wire endpiece 7. However, as described above, the central portion 7a of the endpiece 7 is in a line contact or surface contact condition with one side of the prismatic portion 11a of the endpiece part 9, so that working force is generated so as to restore the initial state, which is the state of the line contact or surface contact condition with one side, when the endpiece part 9 rotates.

Subsequently, an end of the temple 8 is fixed to the cylindrical portion 11b of the endpiece part 9 in a tightly wound condition so as to connect the endpiece part 9 to the temple 8.

In this case, the temple 8 is located inside the bent portion 7, in other words, located towards the user side, and is fixed in a tightly wound condition.

Accordingly, the temple 8 is in one body with the endpiece part 9, and is rotatable at the center hole 12 of the endpiece part 9 or at the upright portion 7c of the endpiece 7 as a center.

Moreover, since the thickness of the temple 8 and the height of the cylindrical portion 11b of the endpiece part 9 are roughly the same, the temple 8 and the central portion 7a of the endpiece 7 are unlikely to rub against each other.

Figure 12:
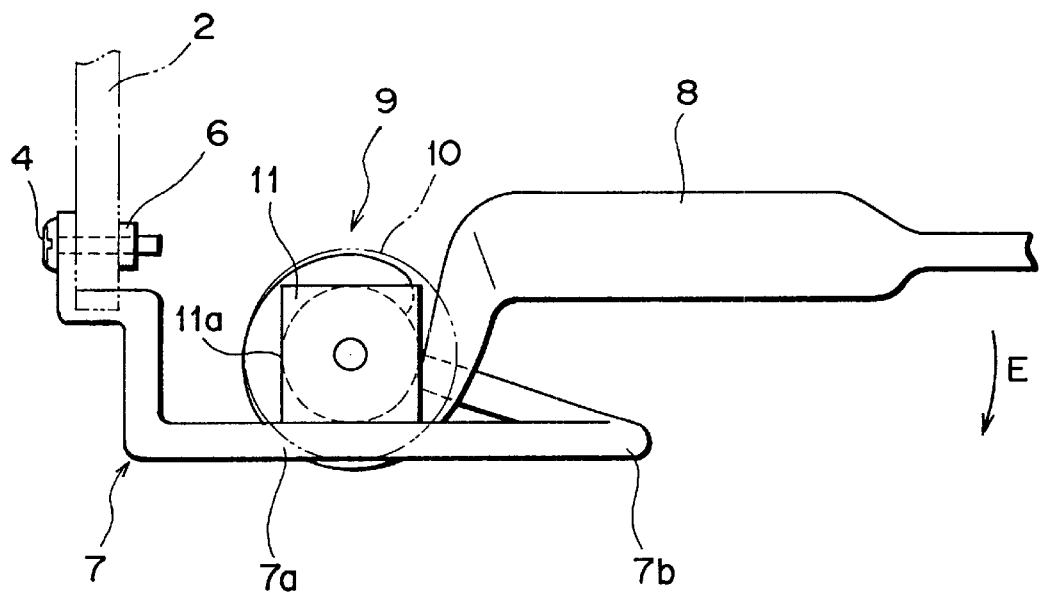
FIG. 12 is a schematic view showing an initial state of a temple in relation to an endpiece.
Figure 13:
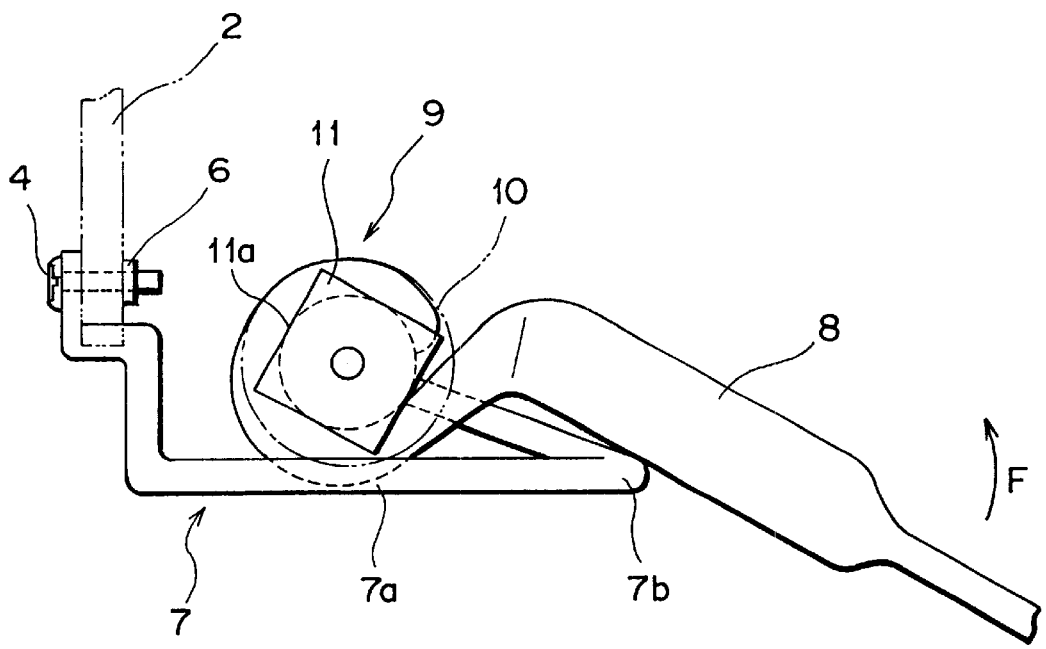
FIG. 13 is a schematic view showing the state where inward force results from the outward rotary movement of a temple in relation to an endpiece.

Being assembled as described above, the temple 8 is rotatable in respect to the endpiece part 9 as shown in FIG. 12 and FIG. 13, and the endpiece 7, having the central portion 7a contacted against one side of the prismatic portion 11a in a pressing condition, is connected to the temple 8, having an end fixed to the cylindrical portion 11b of the endpiece part 9.

When the temple 8 is moved in the direction of an arrow E of FIG. 12 as shown in FIG. 13, the endpiece part 9 is no longer in line contact or surface contact condition with the central portion 7a of the endpiece 7 at one side of the prismatic portion 11a thereof. Accordingly, force in the direction of an arrow F so as to return to the initial state is generated thereby, providing a spring property in addition to the spring property of the temple 8 itself.

Moreover, this spring property may be adjusted by controlling the pressed state where the central portion 7a of the endpiece 7 is contacting against one side of the prismatic portion 11a of the endpiece part 9, and the size of the contacting area.

The maximum rotary movement of the temple 8 is restricted by contacting the temple 8 against the bent portion 7b of the endpiece 7. Even being contacted against the bent portion 7b, the temple 8 will not ride over a corner of the prismatic portion 11a. Accordingly, when the temple 8 is freed, the initial state is restored that is the state where the central portion 7a of the endpiece 7 is in a line contact or surface contact condition with a side of the prismatic portion 11a of the endpiece part 9.

As described above, the endpiece 7 may be fixed to the lens 2 by matching and then screwing the hole, provided at one end of the endpiece 7 connected to the temple 8 through the endpiece part 9, to the hole, provided at the outer side of the lens 2. Therefore, by fixing the endpiece 7 to the respective outer sides of a pair of lenses 2, whose inner sides are connected with the bridge 3, eyeglasses may be provided that also have a spring function, in addition to the spring property of the temple 8 itself, at the section where the endpiece 7, the endpiece part 9 and the temple 8 are connected.

Figure 10:
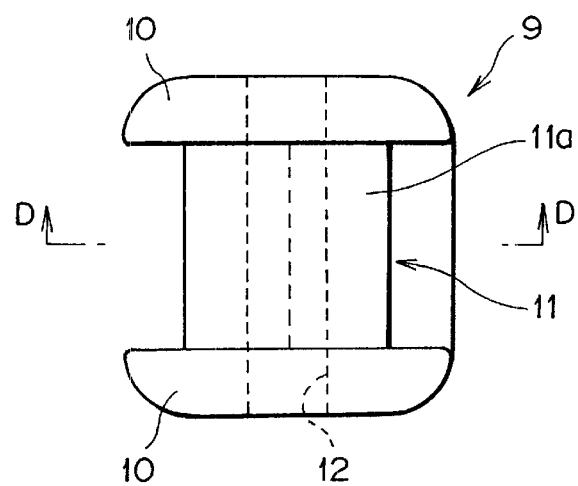
FIG. 10 is a schematic front view showing another endpiece part.
Figure 11:
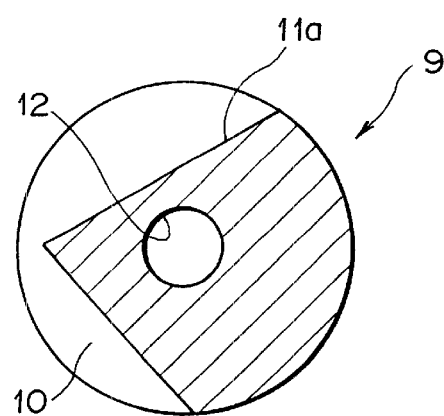
FIG. 11 is a view taken on line D—D of FIG. 10.

FIG. 10 and FIG. 11 show another embodiment of the endpiece part 9, wherein the connecting portion between both jaw portions 10 is solely made up of the two prismatic portions 11a. Being configured this way, the endpiece part 9 has the same functions as those in the above-noted embodiment.

Additionally, although the prismatic portion 11a has a square cross section or two cross section in the above-noted endpiece part 9, the cross section is not limited to this as long as it is polygonal. However, as the number of corners becomes too large, a spring function is unlikely to be attained. The cross section is preferably in a triangle, square, pentagonal or hexagonal shape.

Furthermore, the prismatic portion 11a is not required as long as the endpiece part 9 has a flat part, which can be in line contact or surface contact with the central portion 7a of the endpiece 7.

The materials used for the endpiece 7 are not particularly limited, and every material used for ordinary eyeglasses may be used. However, a spring property may be obtained at an excellent level by using a solid material such as Sun Cobalt (registered Japanese trademark), stainless steel, β-titanium, and so forth.

Being configured as mentioned above, the present invention demonstrates a spring property at the connecting section of an endpiece and a temple, so that fine adjustment can be performed and an excellent fit may be obtained with temples. This allows temples to provide a comfortable fit even without a spring property from temples themselves.

Moreover, since temples have a property preventing them from rotating outward, the chance of damaging endpieces can be reduced even when significant force is generated to move the temples outward.

Furthermore, endpieces and temples function as hinges therebetween and also have a spring property, so that the structure as a whole is made simple.

What is claimed is:

1. A connecting structure between an endpiece, which is arranged at a respective outer side of a pair of lenses connected by a bridge, and a temple, which is mounted to the endpiece through an endpiece part; wherein the endpiece is in a wire form, having one end being mounted to the lens and having another end being bent; wherein the endpiece part has a pair of jaw portions and a connecting portion therebetween so as to connect the jaw portions; wherein the other end of the endpiece is inserted to a center hole provided at the center of the jaw portions and is rotatably supported; wherein a flat part is formed at the connecting portion so as to press a central portion of the endpiece against the flat part in a line contact condition or a surface contact; and wherein the temple is fixed to the connecting portion of the endpiece part.

2. The connecting structure according to claim 1, wherein the endpiece comprises a bent portion at the other end so as to contact against the temple which is turned outward and to prevent the temple from turning further.

3. The connecting structure according to claim 1, wherein the connecting portion of the endpiece part is in a prismatic form at least at a section where the endpiece is pressed against; and wherein one side of the prismatic form is the flat part.

* * * * *